(12) United States Patent
Su et al.

(10) Patent No.: US 7,305,125 B2
(45) Date of Patent: Dec. 4, 2007

(54) COLOR-CORRECTING DEVICE AND METHOD

(75) Inventors: Rick Su, Taoyuan (TW); Tsai Chao Lien, Taoyuan (TW); Ying Hao Hsu, Taoyuan (TW)

(73) Assignee: Benq Corporation, Taoyuan (TW)

( * ) Notice: Subject to any disclaimer, the term of this patent is extended or adjusted under 35 U.S.C. 154(b) by 749 days.

(21) Appl. No.: 10/873,533

(22) Filed: Jun. 18, 2004

(65) Prior Publication Data

US 2004/0258303 A1 Dec. 23, 2004

(30) Foreign Application Priority Data

Jun. 19, 2003 (TW) .............................. 92116701 A

(51) Int. Cl.
*G06K 9/00* (2006.01)
*G09G 5/02* (2006.01)

(52) U.S. Cl. ...................................... 382/167
(58) Field of Classification Search ............... 382/162, 382/164, 165, 167, 173, 218, 219; 345/600–604; 358/515, 518, 523, 525
See application file for complete search history.

(56) References Cited

U.S. PATENT DOCUMENTS 6,434,268 B1 * 8/2002 Asamura et al. ............ 382/162
6,453,066 B1 * 9/2002 Shiraiwa et al. ............ 382/162
6,621,497 B1 * 9/2003 Sugiura et al. ............. 345/600
6,781,716 B1 * 8/2004 Yoda .......................... 358/1.9
6,825,958 B1 * 11/2004 Fukasawa et al. .......... 358/523
6,826,303 B2 * 11/2004 D'Souza et al. ............ 382/167

\* cited by examiner

*Primary Examiner*—Amir Alavi
(74) *Attorney, Agent, or Firm*—Birch, Stewart, Kolasch & Birch, LLP

(57) ABSTRACT

The invention is to provide a color-correcting device and method for matching colors of a first image displayed on an image forming apparatus with colors of a second image displayed on a display apparatus. Moreover, the image forming apparatus captures the first image with a plurality of first color values conforming to a first color space. The image forming apparatus also converts the first color values of the first image into a plurality of second color values conforming to a second color space and outputs the second color values to the display apparatus that displays the second image based on the inputted second color values. In one embodiment, the first color space contains R, G, B, color components, and the second color space contains Y, $C_r$, $C_b$ color components.

22 Claims, 5 Drawing Sheets

COLOR-CORRECTING DEVICE AND METHOD

BACKGROUND OF THE INVENTION

1. Field of the Invention

The present invention relates to a color-correcting device and method, and more particularly, the present invention relates to a color-correcting device and method for substantially matching the colors of the image displayed on an image forming apparatus with the colors of the image displayed on a display apparatus.

2. Description of the Prior Art

No matter what brand of image display apparatuses, such as televisions and overhead projectors, they have five basic adjustment functions of brightness, contrast, tint, color, and sharpness; the main objective of the five basic adjustment functions is to allow users to adjust the image quality displayed on televisions or overhead projectors.

The image source apparatuses connected to the image display apparatuses may be DVD/VCD projectors or digital image forming apparatuses of digital cameras and digital video cameras. Before products are in the market, manufacturers of the above-mentioned image source apparatuses apply a calibrating procedure, so that all the image source apparatuses from their respective factories have the same display expression. However, there are no common calibrating standards among the different factories. Users must manually adjust the adjustment parameters of brightness, contrast, tint, color, and sharpness for getting acceptable image quality when different image source devices of different factories output images to display apparatuses. Therefore, it is not convenient for the users.

Therefore, when digital image forming apparatuses of digital cameras and digital video cameras output and affect display apparatuses, a color calibrating procedure is applied for substantially matching the colors of the images displayed on the image forming apparatus with the colors of the images displayed on a display apparatus.

SUMMARY OF THE INVENTION

Therefore, an objective of the invention is to provide a color-correcting device for matching the colors of the image displayed on an image forming apparatus with the colors of the image displayed on a display apparatus. Besides, when the image forming apparatus outputs images to different display apparatuses respectively, by the color-correcting device of the present invention, the colors of the image displayed on different display apparatuses will substantially match with the colors of the image displayed on the image forming apparatus.

According to the color-correcting device of the present invention, the color-correcting device is configured in an image forming apparatus. The color-correcting device is used for matching colors of a first image displayed on the image forming apparatus with colors of a second image displayed on a display apparatus. The first image captured by the image forming apparatus is formed by an array of pixels; each of these pixels has first color values that conform to a first color space that comprises N first color components. The image forming apparatus also converts the color values of each pixel of the first image into respective second color values that conform to a second color space; this second color space comprises N second color components. Moreover, the image forming apparatus outputs the second color values, conformed to the second color space, of the first image to the display apparatus which displays the second image based on the second color values of the first image, wherein N is a natural number. The color-correcting device comprises a storing module, a converting module, an outputting module, a capturing module, a measuring module, a calculating module, and a correcting module.

The storing module is used for storing at least N third images; each of the third images has third color values that are formed by only one of the N first color components of the first color space.

The converting module is used for converting the third color values, conformed to the first color space of each of the third images, into fourth color values conformed to the second color space respectively.

The outputting module is used for outputting the fourth color values of the third images from the image forming apparatus to the display apparatus respectively, wherein the display apparatus respectively displays at least N fourth images, based on the fourth color values of the third images; each fourth image corresponds to one of the third images.

The capturing module is used for capturing the respective fourth images displayed on the display apparatus and further obtaining at least N fifth images. Each of the fifth images corresponds to one of the fourth images.

The measuring module is used for measuring fifth color values, conformed to the first color space, of each of the fifth images respectively.

The calculating module is used for calculating a set of correction coefficients in accordance with the third color values, conformed to the first color space of the third images and the fifth color values, conformed to the first color space of the fifth images.

The correcting module is used for correcting the second color values of the first image in accordance with the set of correction coefficients, and further obtaining corrected second color values, conformed to the second color space of the first image.

Wherein after the corrected second color values, conformed to the second color space, of the first image are obtained, the image forming apparatus outputs the corrected second color values of the first image to the display apparatus, and then the display apparatus newly displays the second image based on the corrected second color values of the first image, so that the colors in the first image displayed on the image forming apparatus substantially match with the colors in the second image displayed on the display apparatus.

Therefore, by the color-correcting device of the present invention, colors in the image displayed on the image forming apparatus are able to match with colors in the image displayed on a display apparatus.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
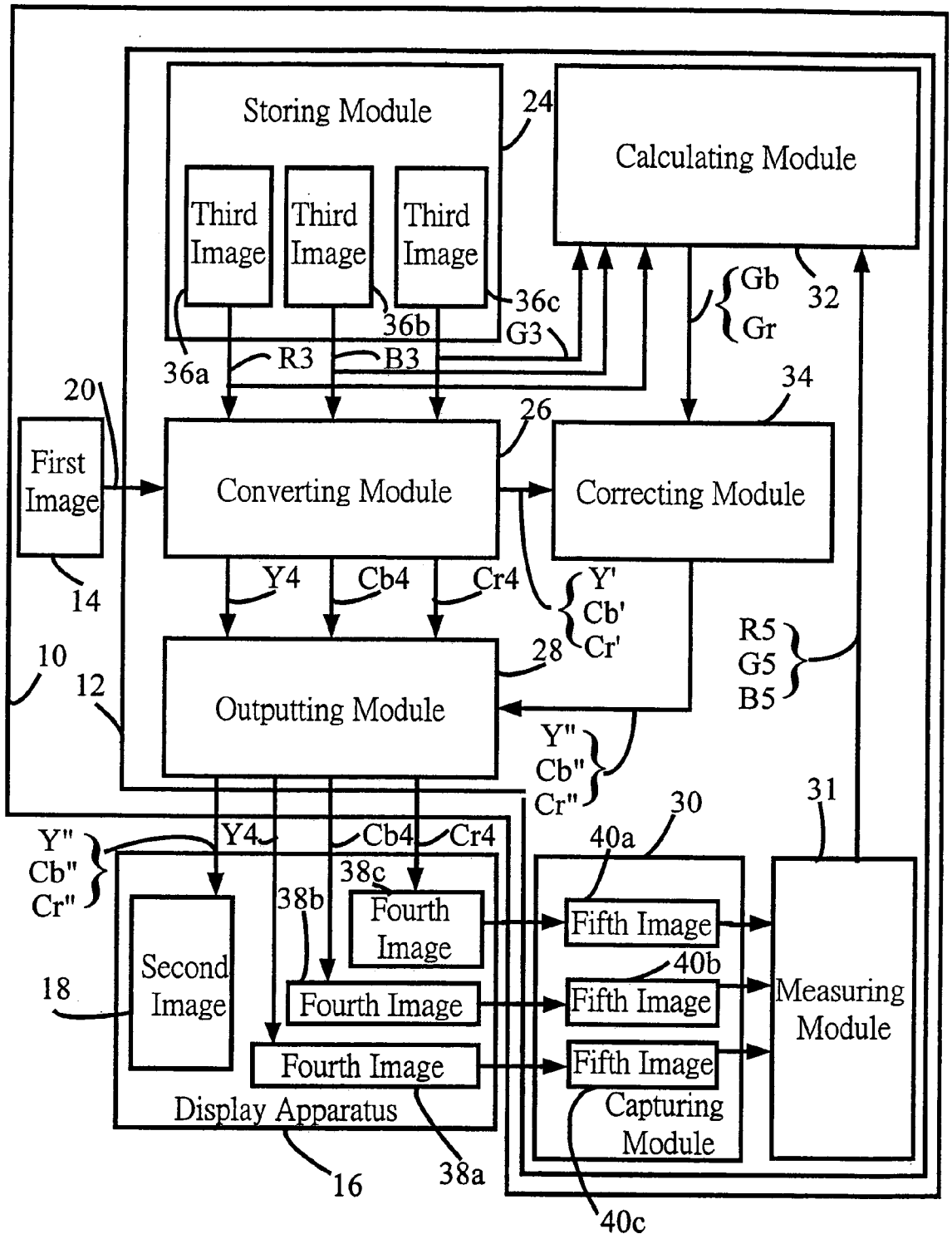
FIG. 1 is a schematic diagram of the color-correcting device according to the present invention.

Referring to FIG. 1, FIG. 1 is a schematic diagram of the color-correcting device according to the present invention. The color-correcting device 12 of the present invention in an image forming apparatus 10 is used for matching colors in a first image 14, displayed on the image forming apparatus 10, with colors in a second image 18 displayed on a display apparatus 16. The image forming apparatus 10 captures the first image 14, which is formed by an array of pixels (Not shown in FIG. 1); each of the pixels has first color values 20 that conform to a first color space (Not shown in FIG. 1) which comprises 3 first color components (R, G, and B). The image forming apparatus 10 also converts the first color values 20 of each pixel of the first image 14 into second color values (Y', $C_b$', and $C_r$'), conformed to a second color space (Not shown in FIG. 1), wherein the second color space comprises 3 second color components (Y, $C_b$, and $C_r$). The image forming apparatus 10 also outputs the second color values (Y', $C_b$', and $C_r$') of the first image 14 to the display apparatus 16 which displays the second image 18 based on the second color values (Y', $C_b$', and $C_r$') of the first image 14. The color-correcting device 12 comprises a storing module 24, a converting module 26, an outputting module 28, a capturing module 30, a measuring module 31, a calculating module 32, and a correcting module 34.

The storing module 24 is used for storing at least 3 third images (36a, 36b, and 36c) each of which has third color values ($R_3$, $G_3$, and $B_3$); the third color values is formed by only one of the 3 first color components (R, G, and B) of the first color space.

The converting module 26 is used for converting the third color values ($R_3$, $G_3$, and $B_3$), conformed to the first color space, of each of the third images (36a, 36b, and 36c) into respective fourth color values ($Y_4$, $C_{r4}$, and $C_{b4}$), conformed to the second color space.

The outputting module 28 is used for outputting the fourth color values ($Y_4$, $C_{r4}$, and $C_{b4}$) of the third images (36a, 36b, and 36c) from the image forming apparatus 10 to the display apparatus 16 respectively, wherein the display apparatus 16 respectively displays at least 3 fourth images (38a, 38b, and 38c), based on the fourth color values ($Y_4$, $C_{r4}$, and $C_{b4}$) of the third images (36a, 36b, and 36c). Each of the fourth images (38a, 38b, and 38c) corresponds to one of the third images (36a, 36b,. and 36c).

The capturing module 30 is used for capturing the fourth images (38a, 38b, and 38c) displayed on the display apparatus 16 respectively and further obtaining at least 3 fifth images (40a, 40b, and 40c); each of the fifth images (40a, 40b, and 40c) corresponds to one of the fourth images (38a, 38b, and 38c).

The measuring module 31 is used for respectively measuring fifth color values ($R_5$, $G_5$, and $B_5$), conformed to the first color space, of each of the fifth images (40a, 40b, and 40c).

The calculating module 32 is used for calculating a set of correction coefficients ($G_b$ and $G_r$) in accordance with the third color values ($R_3$, $G_3$, and $B_3$), conformed to the first color space, of the third images (36a, 36b, and 36c) and the fifth color values ($R_5$, $G_5$, and $B_5$), conformed to the first color space, of the fifth images (40a, 40b, and 40c).

The correcting module 34 is used for correcting the second color values (Y', $C_b$', and $C_r$') of the first image 14 in accordance with the set of correction coefficients ($G_b$ and $G_r$) and further obtaining corrected second color values (Y'', $C_b$'', and $C_r$''), conformed to the second color space, of the first image 14.

Wherein after the corrected second color values (Y'', $C_b$'', and $C_r$''), conformed to the second color space, of the first image 14 are obtained, the image forming apparatus 10 outputs the corrected second color values (Y'', $C_b$'', and $C_r$'') of the first image 14 to the display apparatus 16, and then the display apparatus 16 newly displays the second image 18 based on the corrected second color values (Y'', $C_b$'', and $C_r$'') of the first image 14, so that the colors in the first image 14 displayed on the image forming apparatus 10 substantially match with the colors in the second image 18 displayed on the display apparatus 16.

Besides, the calculating module 32 bases on the third color values ($R_3$, $G_3$, and $B_3$) and the fifth color values ($R_5$, $G_5$, and $B_5$) to calculate the correction coefficients ($G_b$ and $G_r$) by the following formulae:

$$G_b = \frac{B_3/G_3}{B_5/G_5}; \text{ and}$$

$$G_r = \frac{R_3/G_3}{R_5/G_5}$$

The correction module corrects the second color values (Y', $C_b$', and $C_r$') of the first image 14 in accordance with the set of correction coefficients ($G_b$ and $G_r$) and the calculations of the following formulae, thus obtaining corrected second color values (Y'', $C_b$'', and $C_r$''), conformed to the second color space, of the first image 14.

$$Y''=Y';$$

$$C_b''=C_b' \times G_b; \text{ and}$$

$$C_r''=C_r' \times G_r°$$

Furthermore, the image forming apparatus 10 outputs the corrected second color values (Y'', $C_b$'', and $C_r$'') of the first image 14 to the display apparatus 16, and then the display apparatus 16 newly displays the second image 18 based on the corrected second color values (Y'', $C_b$'', and $C_r$'') of the first image 14, so that the colors in the first image 14 displayed on the image forming apparatus 10 substantially match with the colors in the second image 18 displayed on the display apparatus 16.

Therefore, by the color-correcting device 12 of the present invention, colors of the image displayed on an image forming apparatus are able to substantially match with colors of the image displayed on a display apparatus.

Figure 2:
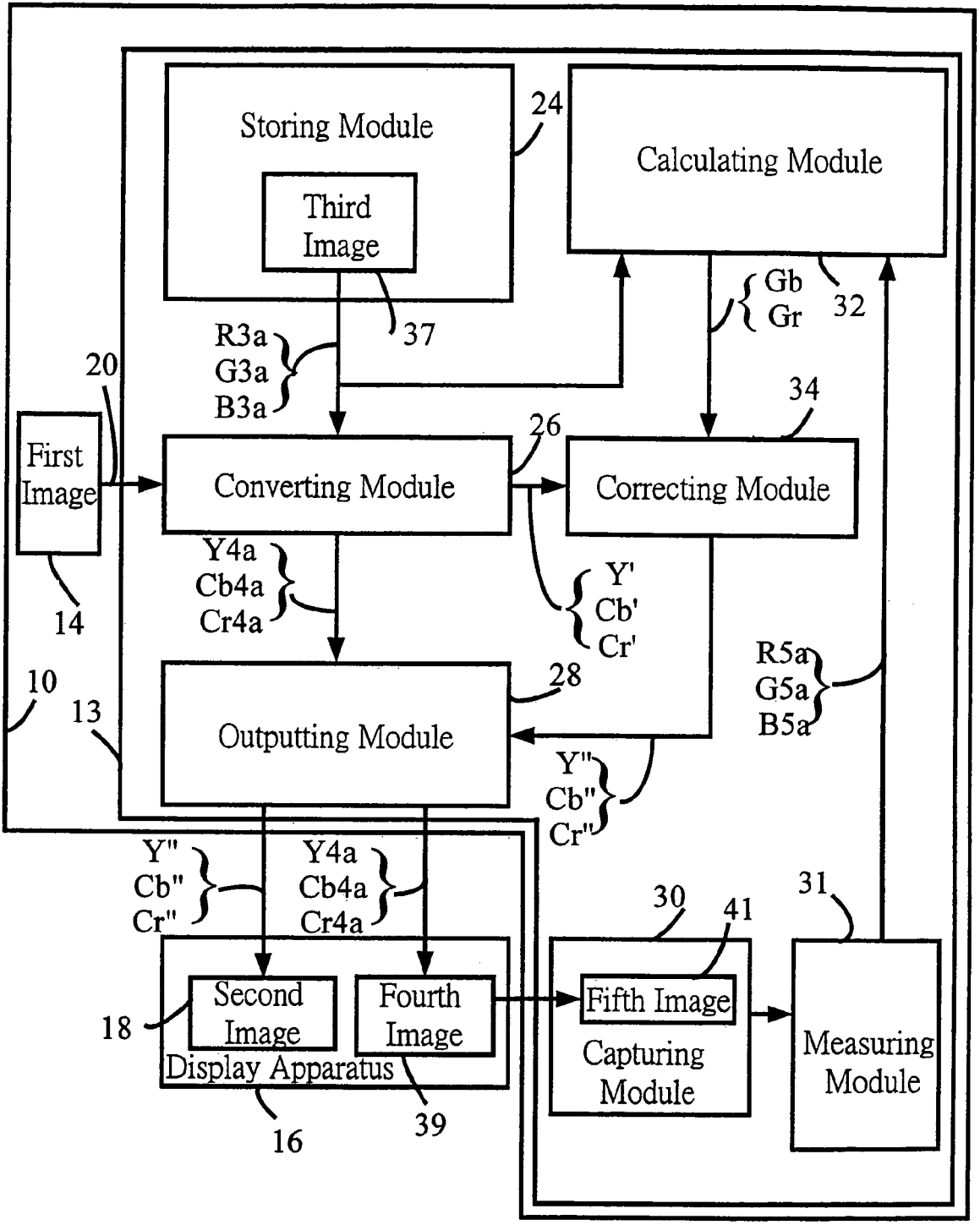
FIG. 2 is a schematic diagram of the color-correcting device according to another embodiment of the present invention.
Figure 3A:
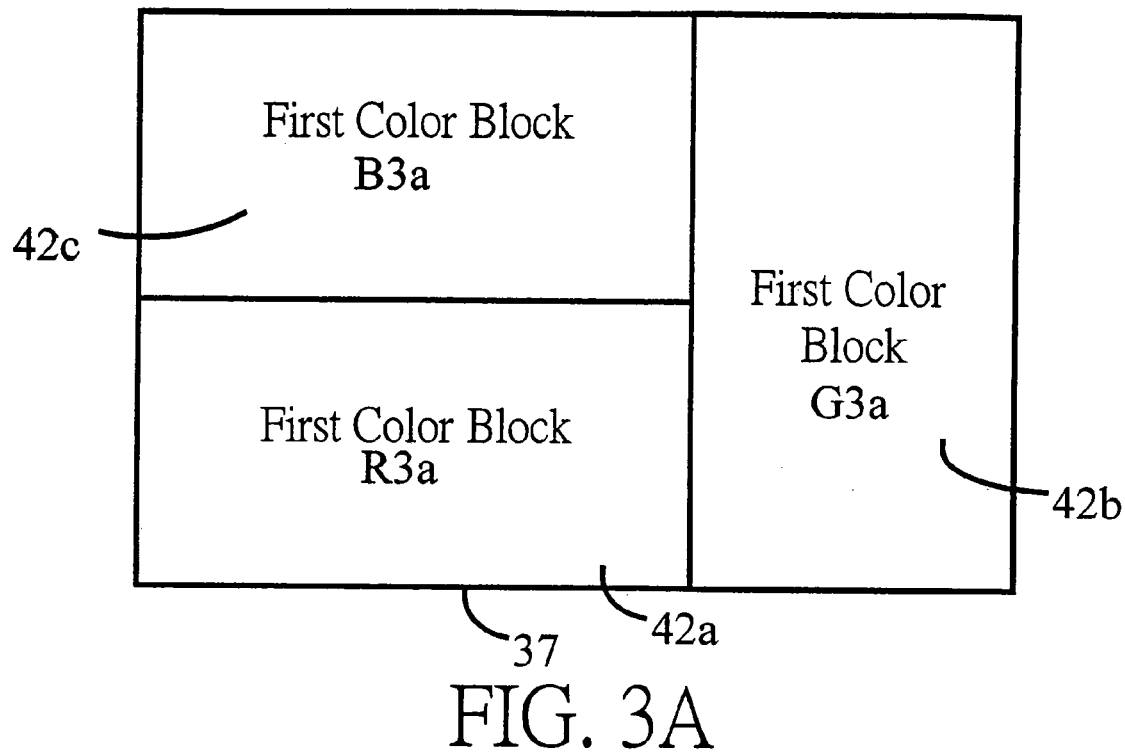
FIG. 3A is a schematic diagram of the third image of the color-correcting device.
Figure 3B:
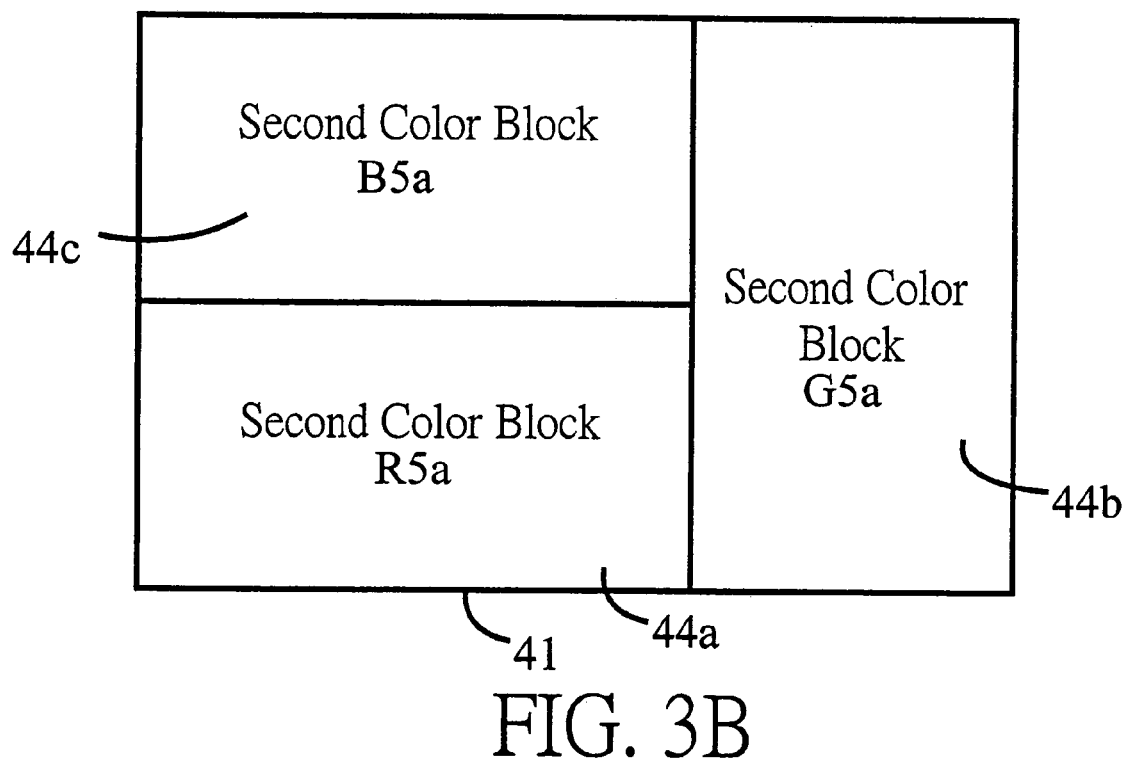
FIG. 3B is a schematic diagram of the fifth image of the color-correcting device.

Referring to FIG. 2, FIG. 3A, and FIG. 3B, FIG. 2 is a schematic diagram of the color-correcting device 13 according to another embodiment of the present invention. FIG. 3A is a schematic diagram of the third image 37 of the color-correcting device 13. FIG. 3B is a schematic diagram of the fifth image 41 of the color-correcting device 13. The storing module 24 of the color-correcting device 13 is used for storing a third image 37; the third image 37 comprises at least 3 first color blocks (42a, 42b, and 42c), each of which has third color values ($R_{3a}$, $G_{3a}$, and $B_{3a}$) that are formed by only one of the 3 first color components (R, G, and B) of the first color space. Therefore, the fifth image 41 corresponded to the third image 37 also comprises the corresponding second color blocks (44a, 44b, and 44c).

The converting module 26 is used for converting the third color values ($R_{3a}$, $G_{3a}$, and $B_{3a}$), conformed to the first color space, of each of the first color blocks into fourth color values ($Y_{4a}$, $C_{r4a}$, and $C_{b4a}$), conformed to the second color space respectively; it then outputs the fourth color values ($Y_{4a}$, $C_{r4a}$, and $C_{b4a}$) of the third image 37 by the outputting module 28 to the display apparatus 16, and then the display apparatus 16 displays a fourth image 39, wherein the fourth image 39 corresponds to the third image 37.

The capturing module 30 is used for capturing the fourth image 39 displayed on the display apparatus 16 and further obtaining a fifth image 41; the fifth image 41 corresponds to the fourth image 39 and third image 37. Therefore, the fifth image 41 comprises at least 3 second color blocks (44a, 44b, and 44c). The second color blocks (44a, 44b, and 44c) correspond to the first color blocks (42a, 42b, and 42c) of the third image 37.

The measuring module 31 is used for measuring fifth color values ($R_{5a}$, $G_{5a}$, and $B_{5a}$), conformed to the first color space, of each of the second color blocks (44a, 44b, and 44c) of the fifth image 41 respectively.

The calculating module 32 is used for calculating a set of correction coefficients ($G_b$ and $G_r$) in accordance with the third color values ($R_{3a}$, $G_{3a}$, and $B_{3a}$) of the first color blocks (42a, 42b, and 42c) of the third image 37 and the fifth color values ($R_{5a}$, $G_{5a}$, and $B_{5a}$) of the second color blocks (44a, 44b, and 44c) of the fifth image 41.

Therefore, by the color-correcting device 13 of the present invention, colors of the images displayed on an image forming apparatus are able to substantially match with colors of the images displayed on a display apparatus.

Figure 4:
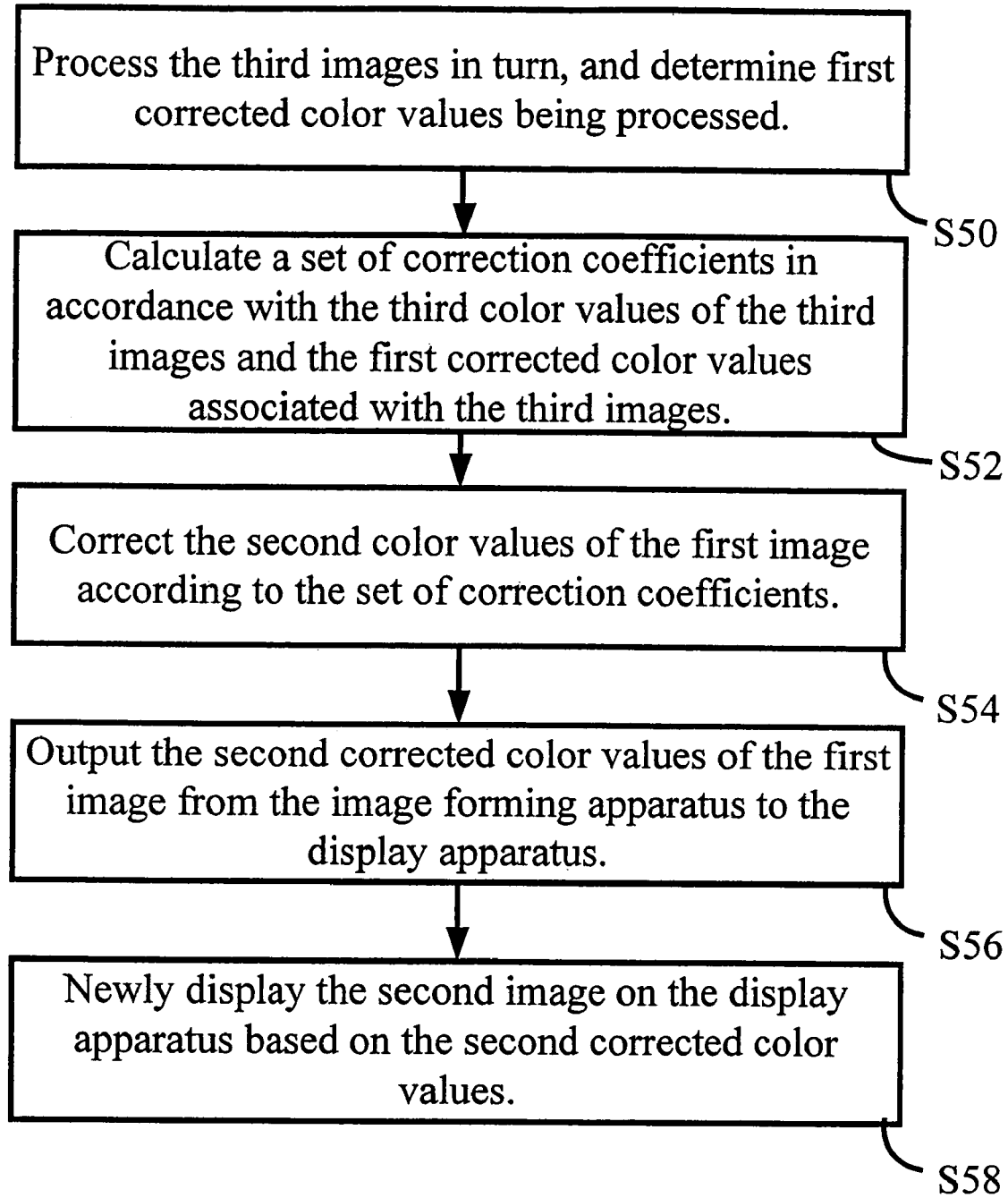
FIG. 4 is a flow chart of the color-correcting method according to the present invention.

Referring to FIG. 4, FIG. 4 is a flow chart of the color-correcting method according to the present invention. The following paragraphs are the detailed descriptions of the color-correcting method of the color-correcting device 12 shown in FIG. 1. The method of the present invention comprises the following steps:

Step S50: process at least 3 third images (36a, 36b, and 36c) pre-stored in the image forming apparatus 10 in turn where each of the third images (36a, 36b, and 36c) has third color values ($R_3$, $G_3$, and $B_3$) which are formed by only one of the 3 first color components (R, G, and B); determine the associated first corrected color values ($R_c$, $G_c$, and $B_c$), conformed to the first color space, of the third images (36a, 36b, and 36c) that are being processed so as to substantially match the colors of the third images (36a, 36b, and 36c), that is being processed and displayed on the image forming apparatus 10, with colors of a corresponding fourth image (38a, 38b, and 38c) that is also being processed and displayed on the display apparatus 16.

Step S52: calculate a set of correction coefficients ($G_b$ and $G_r$) in accordance with the third color values ($R_3$, $G_3$, and $B_3$) of the third images (36a, 36b, and 36c) and the first corrected color values ($R_c$, $G_c$, and $B_c$) associated with the third images (36a, 36b, and 36c).

Step S54: correct, according to the set of correction coefficients ($G_b$ and $G_r$), the second color values (Y', $C_b'$, and $C_r'$) of the first image 14 to obtain second corrected color values (Y'', $C_b''$, and $C_r''$), conformed to the second color space, of the first image 14.

Step S56: output the second corrected color values (Y'', $C_b''$, and $C_r''$) of the first image 14 from the image forming apparatus 10 to the display apparatus 16.

Step S58: newly display the second image 18 on the display apparatus 16 based on the second corrected color values (Y'', $C_b''$, and $C_r''$) so as to substantially match the colors of the first image 14 displayed on the image forming apparatus 10 with the colors of the second image 18 displayed on the display apparatus 16.

Figure 5:
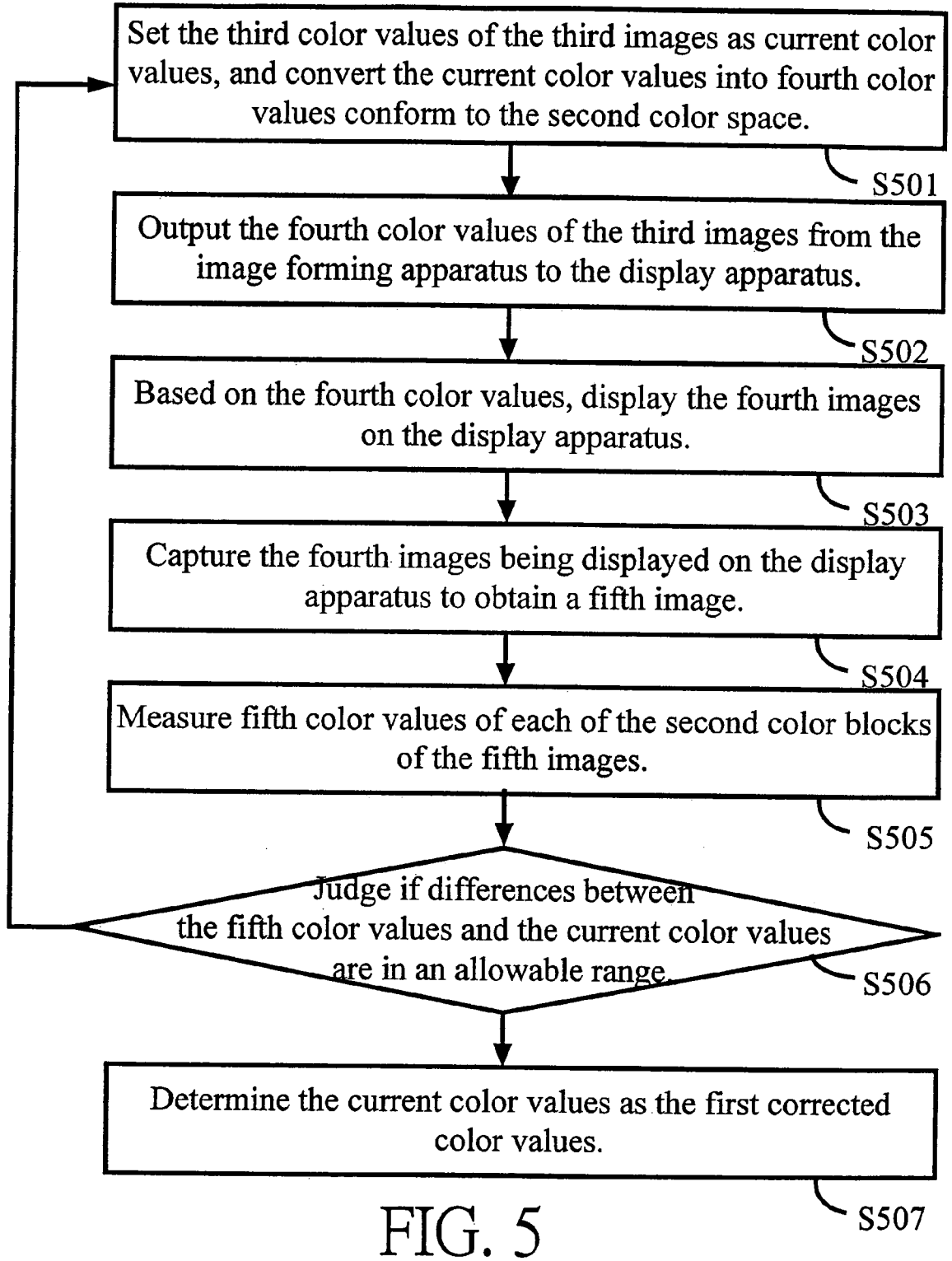
FIG. 5 is a flow chart of the color-correcting method according to the present invention.

Referring to FIG. 5, FIG. 5 is a flow chart of the color-correcting method according to the present invention. The step S50 shown in FIG. 4 further comprises the following steps:

Step S501: set the third color values ($R_3$, $G_3$, and $B_3$) of the third images (36a, 36b, and 36c), which are being processed, as current color values, and convert the current color values into fourth color values ($Y_4$, $C_{r4}$, and $C_{b4}$), conformed to the second color space.

Step S502: output the fourth color values ($Y_4$, $C_{r4}$, and $C_{b4}$) of the third images (36a, 36b, and 36c), which are being processed, from the image forming apparatus 10 to the display apparatus 16.

Step S503: based on the fourth color values ($Y_4$, $C_{r4}$, and $C_{b4}$) of the third images (36a, 36b, and 36c), which are being processed, display the corresponding fourth images (38a, 38b, and 38c), which are being processed, on the display apparatus 16.

Step S504: capture, by the image forming apparatus 10, the fourth images (38a, 38b, and 38c) being displayed on the display apparatus 16 to obtain a fifth image (40a, 40b, and 40c) corresponded to the third images (36a, 36b, and 36c), which are being processed.

Step S505: measure fifth color values ($R_5$, $G_5$, and $B_5$), conformed to the first color space, of each of the fifth images (40a, 40b, and 40c) corresponding to the third image that is being processed.

Step S506: judge if differences between the fifth color values ($R_5$, $G_5$, and $B_5$) and the current color values are in an allowable range, and if NO, replace the current color values by the fifth color values ($R_5$, $G_5$, and $B_5$), and repeat steps S501 through S506.

Step S507: determine the current color values as the first corrected color values ($R_c$, $G_c$, and $B_c$).

Therefore, by the color-correcting device 12 of the present invention, colors of the images displayed on an image forming apparatus are able to substantially match with colors of the images displayed on a display apparatus.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A color-correcting device, used in an image forming apparatus, for matching colors in a first image displayed on the image forming apparatus with colors in a second image displayed on a display apparatus, the image forming apparatus capturing the first image consisting of an array of pixels which each has first color values conforming to a first color space with N first color components, the image forming apparatus also converting the first color values of each pixel of the first image into second color values conforming to a second color space with N second color components respectively, the image forming apparatus also outputting the second color values, conforming to the second color space, of the first image to the display apparatus which displays the second image based on the second color values of the first image, N being a natural number, said device comprising:

a storing module for storing at least N third images which each has third color values consisting of only one of the N first color components of the first color space;

a converting module for converting the third color values, conforming to the first color space, of each of the third images into fourth color values conforming to the second color space respectively;

an outputting module for outputting the fourth color values of the third images from the image forming apparatus to the display apparatus respectively, wherein the display apparatus respectively displays, based on the fourth color values of the third images, at least N fourth images which each corresponds to one of the third images;

a capturing module for capturing the fourth images respectively displayed on the display apparatus to obtain at least N fifth images, each of the fifth images corresponding to one of the fourth images;

a measuring module for measuring fifth color values, conforming to the first color space, of each of the fifth images respectively;

a calculating module for calculating a set of correction coefficients in accordance with the third color values, conforming to the first color space, of the third images and the fifth color values, conforming to the first color space, of the fifth images; and a correcting module for correcting the second color values of the first image in accordance with the set of correction coefficients to obtain corrected second color values, conforming to the second color space, of the first image;

wherein after the corrected second color values, conforming to the second color space, of the first image are obtained, the image forming apparatus outputs the corrected second color values of the first image to the display apparatus, and then the display apparatus newly displays the second image based on the corrected second color values of the first image on the display apparatus such that the colors in the first image displayed on the image forming apparatus substantially match with the colors in the second image displayed on the display apparatus.

2. The color-correcting device of claim 1, wherein the first color space contains R, G, and B (Red, Green, and Blue) color components.

3. The color-correcting device of claim 2, wherein the second color space contains Y, $C_r$ and $C_b$ (luminance, red chromaticity, blue chromaticity) color components.

4. The color-correcting device of claim 3, wherein the third color values, conforming to the first color space, of the third images are symbolized by $R_3$, $G_3$ and $B_3$ respectively, the fifth color values, conforming to the first color space, of the fifth images are symbolized by $R_5$, $G_5$ and $B_5$ respectively, and the set of correction coefficients are symbolized by $G_b$ and $G_r$ respectively and are calculated by the following formulae:

$$G_b = \frac{B_3/G_3}{B_5/G_5}; \text{ and}$$

$$G_r = \frac{R_3/G_3}{R_5/G_5}.$$

5. The color-correcting device of claim 4, wherein the second color values of the first image are symbolized by Y', $C_b'$ and $C_r'$ respectively, the corrected second color values, conforming to the second color space, of the first images are symbolized by Y", $C_b''$ and $C_r''$ respectively, and the corrected second color values are generated by the following formulae:

Y"=Y';

$C_b''=C_b' \times G_b$; and $C_r''=C_r' \times G_r$.

6. A color-correcting method for matching colors in a first image displayed on an image forming apparatus with colors in a second image displayed on a display apparatus, the image forming apparatus capturing the first image consisting of an array of pixels which each has first color values conforming to a first color space with N first color components, the image forming apparatus also converting the first color values of each pixel of the first image into second color values conforming to a second color space with N second color components respectively, the image forming apparatus also outputting the second color values associated with the first image to the display apparatus which displays the second image based on the second color values of the first image, N being a natural number, said method comprising the steps of:

(a) processing at least N third images pre-stored in the image forming apparatus in turn, each of the third images having third color values consisting of only one of the N first color components, determining first corrected color values conforming to the first color space and associated with the third image being processed so as to match colors in the third image, being processed and displayed on the image forming apparatus, with colors in a fourth image corresponding to the third image being processed and displayed on the display apparatus;

(b) calculating a set of correction coefficients in accordance with the third color values of the third images and the first corrected color values associated with the third images;

(c) correcting, according to the set of correction coefficients, the second color values of the first image to obtain second corrected color values, conforming to the second color space, of the first image;

(d) outputting the second corrected color values of the first image from the image forming apparatus to the display apparatus; and (e) newly displaying the second image on the display apparatus based on the second corrected color values so as to substantially match the colors in the first image displayed on the image forming apparatus with the colors in the second image displayed on the display apparatus.

7. The color-correcting method of claim 6, wherein step (a) is performed for the third image being processed by the steps of:

(a1) setting the third color values of the third image being processed as current color values, and converting the current color values into fourth color values conforming to the second color space;

(a2) outputting the four color values of the third image being processed from the image forming apparatus to the display apparatus;

(a3) based on the fourth color values of the third image being processed, displaying the fourth image corresponding to the third image being processed on the display apparatus;

(a4) capturing, by the image forming apparatus, the fourth image being displayed on the display apparatus to obtain a fifth image corresponding to the third image being processed;

(a5) measuring fifth color values, conforming to the first color space, of the fifth image corresponding to the third image being processed;

(a6) judging if differences between the fifth color value and the current color values are in an allowable range, and if NO, replacing the current color values by the fifth color values, and repeating steps (a1) through (a6); and (a7) determining the current color values as the first corrected color values.

8. The color-correcting method of claim 7, wherein the first color space contains R, G and B (red, green and blue) color components.

9. The color-correcting method of claim 8, wherein the second color space contains Y, $C_r$ and $C_b$ (luminance, red chromaticity and blue chromaticity) color components.

10. The color-correcting method of claim 9, wherein the third color values are symbolized by $R_3$, $G_3$ and $B_3$ respectively, the first corrected color values are symbolized by $R_c$, $G_c$ and $B_c$ respectively, and the set of correction coefficients are symbolized by $G_b$ and $G_r$ respectively and are calculated by the following formulae:

$$G_b = \frac{B_3/G_3}{B_c/G_c}; \text{ and}$$

$$G_r = \frac{R_3/G_3}{R_c/G_c}.$$

11. The color-correcting method of claim 10, wherein the second color values of each pixel of the first image are symbolized by Y', $C_b'$ and $C_r'$ respectively, the second corrected color values of each pixel of the first image are symbolized by Y", $C_b"$ and $C_r"$ respectively, and the second corrected color values are generated by the following formulae:

$$Y"=Y';$$

$$C_b"=C_b' \times G_b; \text{ and}$$

$$C_r"=C_r' \times G_r.$$

12. A color-correcting device, used in an image forming apparatus, for matching colors in a first image displayed on the image forming apparatus with colors in a second image displayed on a display apparatus, the image forming apparatus capturing the first image consisting of an array of pixels which each has first color values conforming to a first color space with N first color components, the image forming apparatus also converting the first color values of each pixel of the first image into second color values conforming to a second color space with N second color components respectively, the image forming apparatus also outputting the second color values, conforming to the second color space, of the first image to the display apparatus which displays the second image based on the second color values of the first image, N being a natural number, said device comprising:

a storing module for storing a third image comprising at least N first color blocks which each has third color values consisting of only one of the N first color components of the first color space;

a converting module for converting the third color values, conforming to the first color space, of each of the first color blocks into fourth color values conforming to the second color space respectively;

an outputting module for outputting the fourth color values of the third image from the image forming apparatus to the display apparatus, wherein the display apparatus respectively displays, based on the fourth color values of the third image, a fourth image corresponding to the third image;

a capturing module for capturing the fourth image displayed on the display apparatus to obtain a fifth image corresponding to the third image and comprising at least N second color blocks;

a measuring module for measuring fifth color values, conforming to the first color space, of each of the second color blocks of the fifth image respectively;

a calculating module for calculating a set of correction coefficients in accordance with the third color values, conforming to the first color space, of the third image and the fifth color values, conforming to the first color space, of the fifth image; and a correcting module for correcting the second color values of the first image in accordance with the set of correction coefficients to obtain corrected second color values, conforming to the second color space, of the first image;

wherein after the corrected second color values, conforming to the second color space, of the first image are obtained, the image forming apparatus outputs the corrected second color values of the first image to the display apparatus, and then the display apparatus newly displays the second image based on the corrected second color values of the first image on the display apparatus such that the colors in the first image displayed on the image forming apparatus substantially match with the colors in the second image displayed on the display apparatus.

13. The color-correcting device of claim 12, wherein the first color space contains R, G, and B (Red, Green, and Blue) color components.

14. The color-correcting device of claim 13, wherein the second color space contains Y, $C_r$ and $C_b$ (luminance, red chromaticity, blue chromaticity) color components.

15. The color-correcting device of claim 14, wherein the third color values, conforming to the first color space, of the third image are symbolized by $R_3$, $G_3$ and $B_3$ respectively, the fifth color values, conforming to the first color space, of the fifth image are symbolized by $R_5$, $G_5$ and $B_5$ respectively, and the set of correction coefficients are symbolized by $G_b$ and $G_r$ respectively and are calculated by the following formulae:

$$G_b = \frac{B_3/G_3}{B_5/G_5}; \text{ and } G_r = \frac{B_3/G_3}{B_5/G_5}.$$

16. The color-correcting device of claim 15, wherein the second color values of the first image are symbolized by Y', $C_b'$ and $C_r'$ respectively, the corrected second color values of the first image are symbolized by Y", $C_b"$ and $C_r"$ respectively, and the corrected second color values are generated by the following formulae:

$$Y"=Y';$$

$$C_b"=C_b' \times G_b; \text{ and}$$

$$C_r"=C_r' \times G_r.$$

17. A color-correcting method for matching colors in a first image displayed on an image forming apparatus with colors in a second image displayed on a display apparatus, the image forming apparatus capturing the first image consisting of an array of pixels which each has first color values conforming to a first color space with N first color components, the image forming apparatus also converting the first color values of each pixel of the first image into second color values conforming to a second color space with N second color components respectively, the image forming apparatus also outputting the second color values of the first image to the display apparatus which displays the second image based on the second color values of the first image, N being a natural number, said method comprising the steps of:

(a) processing one of the third images pre-stored in the image forming apparatus, the third image comprising at least N first color blocks which each has third color values consisting of only one of the N first color components, and determining first corrected color values conforming to the first color space and associated with the third image so as to match colors in the third image displayed on the image forming apparatus with colors in a fourth image corresponding to the third image and displayed on the display apparatus;

(b) calculating a set of correction coefficients in accordance with the third color values of the third image and the first corrected color values associated with the third image;

(c) correcting, according to the set of correction coefficients, the second color values of the first image to obtain second corrected color values, conforming to the second color space, of the first image;

(d) outputting the second corrected color values of the first image from the image forming apparatus to the display apparatus; and (e) newly displaying the second image on the display apparatus based on the second corrected color values so as to substantially match the colors in the first image displayed on the image forming apparatus with the colors in the second image displayed on the display apparatus.

18. The color-correcting method of claim 17, wherein step (a) is performed for the third image by the steps of:

(a1) setting the third color values of the third image as current color values, and converting the current color values into fourth color values conforming to the second color space;

(a2) outputting the fourth color values of the third image from the image forming apparatus to the display apparatus;

(a3) based on the fourth color values of the third image, displaying the fourth image corresponding to the third image on the display apparatus;

(a4) capturing, by the image forming apparatus, the fourth image being displayed on the display apparatus to obtain a fifth image corresponding to the third image and comprising at least N second color blocks;

(a5) measuring fifth color values, conforming to the first color space, of each of the second color blocks of the fifth image respectively;

(a6) judging if differences between the fifth color values and the current color values are in an allowable range, and if NO, replacing the current color values by the fifth color values, and repeating steps (a1) through (a6); and (a7) determining the current color values as the first corrected color values.

19. The color-correcting method of claim 18, wherein the first color space contains R, G and B (red, green and blue) color components.

20. The color-correcting method of claim 19, wherein the second color space contains Y, $C_r$ and $C_b$ (luminance, red chromaticity and blue chromaticity) color components.

21. The color-correcting method of claim 20, wherein the third color values are symbolized by $R_3$, $G_3$ and $B_3$ respectively, the first corrected color values are symbolized by $R_c$, $G_c$ and $B_c$ respectively, and the set of correction coefficients are symbolized by $G_b$ and $G_r$ respectively and are calculated by the following formulae:

$$G_b = \frac{B_3/G_3}{B_c/G_c}; \text{ and}$$

$$G_r = \frac{R_3/G_3}{R_c/G_c}.$$

22. The color-correcting method of claim 21, wherein the second color values of each pixel of the first image are symbolized by Y', $C_b'$ and $C_r'$ respectively, the second corrected color values of each pixel of the first image are symbolized by Y", $C_b"$ and $C_r"$ respectively, and the second corrected color values are generated by the following formulae:

$$Y"=Y';$$

$$C_b"=C_b' \times G_b; \text{ and}$$

$$C_r"=C_r' \times G_r.$$

* * * * *